Nov. 3, 1925.　　　　　　　　　　　　　　1,560,423
B. E. HERVEY
CHILD'S VEHICLE
Original Filed March 19, 1924
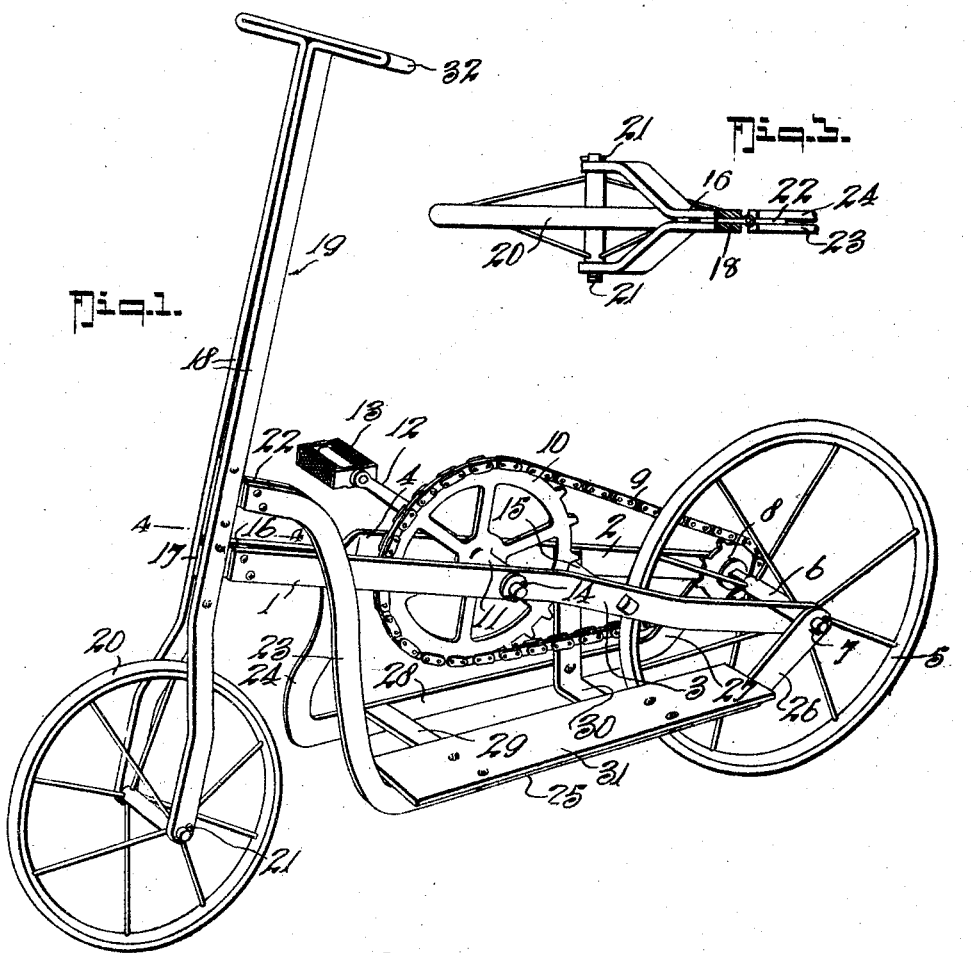
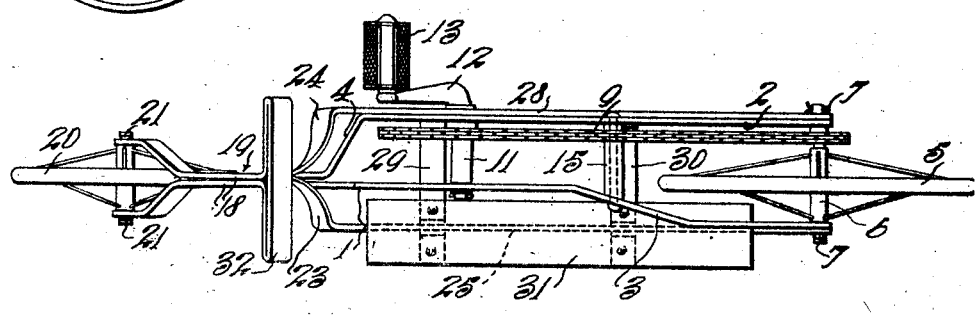
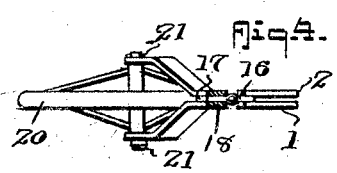
INVENTOR
Ben E. Hervey.
BY
Albert E. Dietrich
ATTORNEY Patented Nov. 3, 1925.

1,560,423

UNITED STATES PATENT OFFICE.

BEN E. HERVEY, OF WILMINGTON, CALIFORNIA, ASSIGNOR, BY MESNE ASSIGNMENTS, TO DATUS M. HERVEY, OF VALLEJO, CALIFORNIA.

CHILD'S VEHICLE.

Application filed March 19, 1924, Serial No. 700,359. Renewed September 25, 1925.

*To all whom it may concern:*

Be it known that I, BEN E. HERVEY, a citizen of the United States, residing at Wilmington, in the county of Los Angeles and State of California, have invented a new and Improved Child's Vehicle, of which the following is a specification.

My invention relates to certain new and useful improvements in cycle coasters especially adapted for the use of children. Coasters of this type usually comprise a frame having steering wheel and post and a rear wheel with an underslung platform on which the child places one foot while propelling the vehicle by pushing with the other foot.

My present invention has for its object to provide such a vehicle with a pedal, sprocket and chain drive and to so arrange and construct the parts as to maintain the proper balance and to provide the required strength without increasing the weight of the vehicle unduly.

In its general nature the invention comprises a frame composed of bars between which the rear wheel and axle is journalled, as is also a sprocket and pedal crank shaft, the crank and pedal portion of which is located at one side of the frame, a chain connecting the sprocket with a sprocket on the rear wheel axle. On the side of the frame opposite that having the pedal is located the underslung platform on which the user stands with one foot while impelling the vehicle with the other through the pedal, sprocket and chain drive. To the front of the frame is pivotally secured a vertical handle post and steering wheel carrier, by means of which the vehicle is properly directed in its travel.

In its more detailed nature the invention resides in those novel features of construction, combination and arrangement of parts, all of which will be first fully described, then be particularly pointed out in the appended claims, reference being had to the accompanying drawing, in which:—

Figure 1 is a perspective view of the invention.

Figure 2 is a top plan view of the same.

Figure 3 is a detail horizontal section through one of the hinge connections of the frame with the steering post on the line 3—3 of Figure 2.

Figure 4 is a detail cross section on the line 4—4 of Figure 1.

In the drawing, in which like numerals of reference designate like parts in all the figures, the main frame of the vehicle is made up of two longitudinal strap irons 1 and 2, the iron 1 being offset, as at 3, and the iron 2 being offset as at 4, in order to provide the proper spacing to receive the sprocket and chain drive and the rear wheel 5. The rear wheel 5 has a shaft 6 journalled in bearing apertures in the rear ends of the bars 1 and 2 and held against lateral movement by cotter pins 7. A sprocket 8 is on the wheel 5 which is driven through the chain 9 from the master sprocket 10 on the crank shaft 11, the crank shaft 11 being journalled in bearing apertures in the irons 1 and 2 and having the crank 12 preferably located at the right hand side of the vehicle and carrying the pedal 13. The crank shaft 11 may be also held in place by a cotter pin 14. The bars 2—2 are braced together at the rear of the sprocket wheel by a cross brace 15.

At the front the bars 1 and 2 carry one element 16 of a hinge joint, the other element 17 of which is secured between the vertical portions 18—18 of the steering post 19, the portions extending downwardly and being spaced apart to form the fork for the front wheel 20, the front wheel 20 having its shaft passed through apertures in the lower end of the fork and held in place by cotter pins 21.

Another hinge joint 22 is located above the level of the hinge joint 16—17, one element of which hinge joint 22 is secured between the ends of the brace bars 23 and 24, the bar 23 extending down and then rearwardly, as at 25, and back and up as at 26, and is secured to the rear end of the bar 1, it being apertured for the passage of the axle 6.

The bar 24 is similarly formed and extends at the right hand side of the vehicle, the rear end 27 of this bar being secured to the rear end of the bar 2 as clearly shown. The horizontal portions 25 and 28 of the bars 23 and 24 are cross braced, as at 29 and 30, and support the platform 31 on which the operator stands with one foot while operating on the pedal 13 with the other foot.

It will be seen from the foregoing description, taken in connection with the accompanying drawing, that my construction is exceedingly simple and rugged and yet light and it can be manufactured at a very low cost.

Of course it should be understood that the steering post 19 is provided with the usual handle 32 for steering purposes.

From the foregoing description, taken in connection with the accompanying drawing, it is thought the complete construction, operation and advantages of my invention will be clear to those skilled in the art.

What I claim is:

1. In a vehicle of the class described, a main frame composed of two bars, the front ends of which are in juxtaposition and the rear ends of which are offset to receive a wheel, a wheel and axle journalled in the rear ends of said bars, a crank shaft journalled in bearing apertures in said bars intermediate the ends of the same, a sprocket wheel on said crank shaft, a sprocket wheel connected to the rear axle, a chain drive between said sprockets, a sub-frame consisting of bars secured to the first mentioned bars and extending below the same, hinge elements carried by said main and sub-frame bars, a steering post with fork, hinge elements carried by said steering post cooperating with the hinge elements of the frame bars, a wheel mounted in said fork, the crank of said crank shaft lying to one side of the main frame, and a platform support for said supplemental frame in the side opposite the crank.

2. A vehicle of the class stated, comprising a vertical steering post having a fork in its bottom, an axle journalled in bearing apertures in said fork, a steering wheel on said axle, a pair of hinge elements secured to said steering post in different horizontal planes, a main frame, a hinge element carried by said main frame to cooperate with the lower hinge element of the steering post, said main frame comprising bars extending rearwardly of the steering post, a shaft journalled in bearing apertures in the rear ends of said bars, a rear wheel on said last named shaft, means for bracing said bars in spaced relation, a crank shaft journalled in bearing apertures in said bars in advance of the rear wheel, sprocket and chain connections between said crank shaft and said rear wheel, a crank on said crank shaft with pedal located at one side of said frame bars, a platform located at the other side of said frame bars beneath the plane of the same, and a sub-frame secured to said frame bars for sustaining said platform, said sub-frame including a portion projected above said frame bars forwardly and a hinge element secured to said sub-frame portion to cooperate with the upper hinge element of the steering post.

BEN E. HERVEY.